United States Patent [19]
Blondeel

[11] 3,796,189
[45] Mar. 12, 1974

[54] CAGE BATTERY, PARTICULARLY FOR TABLE CHICKENS

[75] Inventor: Paul Marie Joseph Blondeel, Schoten, Belgium

[73] Assignee: Hendrix' Fabrieken N.V., Boxmeer, Netherlands

[22] Filed: July 13, 1972

[21] Appl. No.: 271,465

[30] Foreign Application Priority Data
July 13, 1971 Netherlands....................... 7109684

[52] U.S. Cl......................... 119/17, 119/18, 119/82
[51] Int. Cl.......................................... A01k 31/06
[58] Field of Search............. 119/17, 18, 21, 22, 30, 119/37, 82; 214/83.2, 83.18

[56] References Cited
UNITED STATES PATENTS
3,109,413  11/1963  Patchett............................ 119/17 X
2,725,036  11/1955  Petrie................................... 119/17
3,173,564  3/1965  Mayo............................... 119/12 X
3,396,703  8/1968  Trussell............................... 119/30

*Primary Examiner*—Hugh R. Chamblee
*Attorney, Agent, or Firm*—Marshall & Yeasting

[57] ABSTRACT

A cage battery, particularly for slaughter chickens, comprises an assembly of cages arranged in one or more layers, each cage being delimited by two side walls, an intermediary wall, a bottom, a front and a back wall, wherein below each layer of cages a continuous reception and transport space is formed, at least a portion of the bottom of each cage being movable between a closed position and an opened position in which the cage space communicates with the reception and transport space.

5 Claims, 1 Drawing Figure

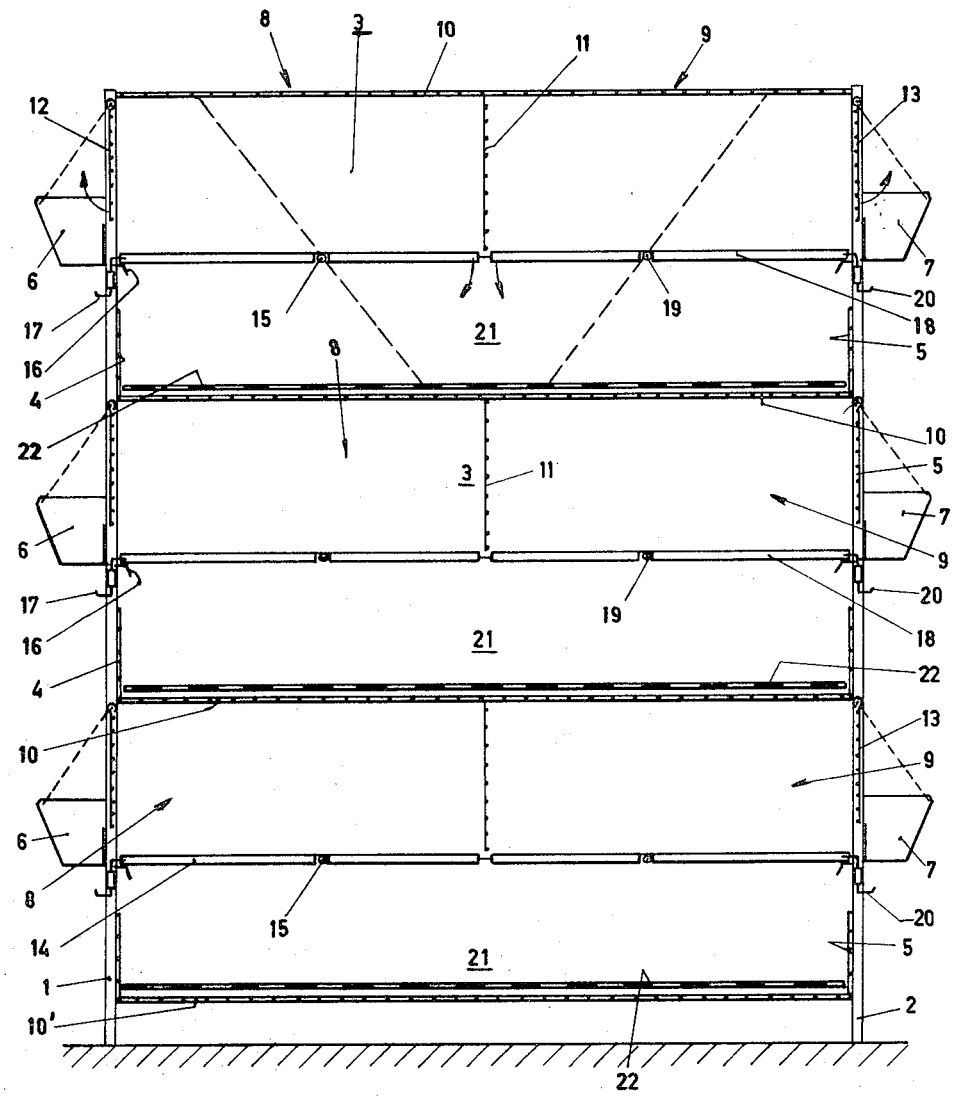

3,796,189

CAGE BATTERY, PARTICULARLY FOR TABLE CHICKENS

BACKGROUND OF THE INVENTION

Until recently the growing of table chickens and similar poultry was done rather generally according to the so-called ground system, that is to say the animals were housed on litter on ground level. In connection with the disadvantages of said system, such as the appearance of certain diseases, the low occupation per volume unit and particularly also the large amount of expensive manual work, there has been an increasing tendency to change-over to the so-called battery system, according to which the animals are housed in a battery of cages arranged in layers, in imitation of the housing, known already since many years, of layer hens in so-called layer batteries.

Two principles may be distinguished therewith. According to a first principle the cages are arranged fixedly, which brings along the advantage of a light weight and thereby relatively inexpensive battery construction. However, a major disadvantage of said system is that the "loading" of the animals when fit for slaughter always requires much manual work since the animals have to be transferred by hand from the fixedly mounted cages to containers serving for the transport to the slaughter house.

According to a second principle the cages are arranged removably as separate elements in the battery and may be used at the same time as transport containers. Indeed this principle is work-saving when considering the "loading" aspect; it involves, however, a heavier and more expensive battery construction, while the requirements for a breeding cage do not mate with those for a cage serving for the transport between the breeding place and the slaughter-house.

SUMMARY OF THE INVENTION

The invention therefore aims at providing a cage battery which combines the advantages of the known systems and avoids their disadvantages.

In accordance with the present invention a cage battery, particularly for slaughter chickens, is provided which comprises below each layer of cages a continuous transport space, at least a portion of the bottom of each cage being movable between a closed position and an open position in which the cage space communicates with said transport space. When the chickens bred in such a battery have become fit for slaughter and have to be transported to the slaughter-house, the cage bottoms may be simply opened to transfer the animals into the transport space there-below and to transfer them through said transport space to the loading station at a longitudinal end of the battery. At said loading station the animals may then be received in a simple way in containers for further transportation to the slaughter-house.

Preferably the bottom of the transport space is constituted by a conveyor belt, which during the breeding period may also serve as a manure discharge belt.

Preferably also the bottom of each cage is pivotable around an axis situated in the bottom plane between a horizontal closed position and an open position inclined downwardly towards the transport space below the cage.

According to a further feature of the invention the pivot shaft of the bottom is positioned relative to the centre of gravity of the bottom so that the unloaded bottom automatically returns from its opened position to the closed position under the influence of gravity.

BRIEF DESCRIPTION OF THE DRAWING

The drawing is a cross-section of a fattening chicken battery according to the invention.

DESCRIPTION OF THE PREFERRED EMBODIMENT

The battery comprises a plurality of longitudinally spaced pairs of uprights 1, 2. The uprights 1, 2 of each pair of uprights are mutually connected by a number of (in the embodiment shown three) transverse elements 3.

The uprights 1 and 2 respectively are, as seen in the longitudinal direction of the battery, mutually connected by upright longitudinal elements 4 and 5 respectively which are constituted by a network of longitudinal and transverse wires. Three feeding troughs 6 and 7 respectively extend along each of the longitudinal battery sides, which troughs also may be considered as longitudinal connection elements between the uprights 1 and 2 respectively.

The transverse connection elements 3 may be made of sheet metal and each constitute a common side wall of two longitudinally adjacent pairs of cages 8, 9.

The longitudinally adjacent pairs of cages together form a cage layer or storey. In the embodiment shown there are three such layers or storeys, indicated hereinafter as layers I, II and III counting upward.

The cage layers are each delimited at their upper side by a wall 10 extending along the full length and width of the battery, which in the embodiment shown is constituted like the longitudinal elements 4 and 5, by a network of longitudinal and transverse wires. The cages 8 and 9 of each pair of cages are separated one from the other by a common back wall 11 positioned in the longitudinal direction of the battery between the respective intermediary elements 3, which is likewise formed from a network of longitudinal and transverse wires. The front walls of the cages are formed by removable panels 12 which are pivotally mounted around their upper edge between the closed position as shown and the opened position indicated by broken lines, while the front walls of the cages 9 are constituted by similar panels 13.

The bottoms 14 of the cages 8, which in the embodiment shown are constituted by a perforated sheet with downwardly turned side edges, are suspended pivotally and removably from shafts or stub shafts 15 extending longitudinally of the battery between the lower edges of the respective intermediary elements 3. The bottoms 14 rest, in the closed position shown, at the front side of the cages on an abutment edge 16, serving at the same time as a spilling edge, and may be locked in this position by means of locks 17 secured to the uprights 1, which in this case are in the form of pivot locks and cooperate with a bent-over edge portion of the bottom 14.

The bottoms 14 and 18 respectively may pivot in the direction of the arrows to the positions indicated by broken lines, in which positions they are inclined downwardly towards a receiving and transport space 21 extending along the full length of the battery and situated below the respective cage layers.

The spaces 21 below the cage layers II and III are each at the underside and laterally defined by the longitudinal elements 4, 5 and by the upper walls 10, integral therewith, of the cage layers I and II respectively, situated therebelow. The space 21 below the lowest cage layer I is at its underside delimited by an additional metal wire wall 10' extending along the full length and width of the battery and constituting an integral unit with the lowest longitudinal elements 4 and 5. The height of the spaces 21 is adapted to the size of the animals when fit for slaughter. A conveyor belt run 22 is movable along the bottom 10 or 10' respectively of each space 21 in the longitudinal direction of the cage battery. Said conveyor belt runs belong to a single conveyor belt or to a plurality of separate conveyor belts, which are guided over (drive) rollers (not shown in the drawing) positioned at the ends of the battery.

During the breeding period the manure falling through the bottoms 14 and 18 is received by the conveyor belt runs 22 and discharged towards an end of the cage battery. The same conveyor belt runs may be used when the chickens are fit for slaughter and have to be transferred from the battery to the transport containers. Therefor subsequently for example first the bottoms 14 of the cages 8 situated at one battery side are pivoted to the positions indicated by broken lines, whereby the animals on said bottoms are urged to go to the underlying reception and transport spaces 21.

It should be noted that the shafts or shaft stubs 15 and 19 respectively are positioned such that the centres of gravity of the bottoms are at a distance from said shafts, namely between said shafts and the front sides of the relative cages. This means that if the locks 17 or 20 respectively are placed in their inoperative positions the bottoms 14 and 18 respectively generally will not automatically resume their pivoted positions but that therefor an extra intervention or action is necessary. Said intervention or action may be such that the operator forces the animals backwards by means of the upwardly pivoted front wall of the respective cage, whereby the centre of gravity of the bottom and the animals together is displaced towards the other side of the pivot shaft, whereby the pivotal movement is initiated and the discharge of the respective cage further takes place automatically. The advantage of the said arrangement of the pivot shaft is that as soon as the last animal of the respective cage has left the corresponding pivoted bottom, said bottom automatically returns into the closed position under the influence of its own weight.

Of course the invention is not restricted to the embodiment shown. Several modifications thereto are possible within the field of the invention.

I claim:

1. A cage battery, particularly for growing chickens for consumption, comprising at least one tier of cages arranged in end-to-end relationship, each individual cage having side walls and upper and bottom walls, wherein the improvement comprises a continuous collecting and conveying compartment, immediately below each tier of cages, the bottom of which is constituted by a conveyor belt spaced below the tier of cages at a distance such that the height of the collecting compartment is sufficient to accommodate matured chickens, at least a portion of the bottom of each cage being movable between a closed position and an open position in which the chickens are directed downward into the collecting compartment.

2. A cage battery according to claim 1, characterized in that the bottom of each cage is pivotable around a shaft situated in the bottom plane, between a horizontal closed position and an opened position inclined downwardly towards the reception and transport space below the cage.

3. A cage battery according to claim 2, characterized in that the pivot shaft of the bottom is so situated relative to its centre of gravity that the empty bottom automatically drops back from its opened position under the influence of its weight to the closed position.

4. A cage battery according to claim 3, characterized in that the cage bottom is lockable in its closed position.

5. A cage battery according to claim 2, characterized in that the cage bottom is removably supported on its shaft.

* * * * *